(12) United States Patent
Provost et al.

(10) Patent No.: US 9,701,413 B2
(45) Date of Patent: Jul. 11, 2017

(54) LOCKING DEVICE WITH MECHANICAL DETECTION OF CLOSURE AND OPENING

(71) Applicant: AIRCELLE, Gonfreville L'Orcher (FR)

(72) Inventors: Fabrice Provost, Notre-Dame-du-Bec (FR); Pascal Soulier, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 831 days.

(21) Appl. No.: 14/040,978

(22) Filed: Sep. 30, 2013

(65) Prior Publication Data

US 2014/0030079 A1 Jan. 30, 2014

Related U.S. Application Data

(63) Continuation of application No. PCT/FR2012/050586, filed on Mar. 21, 2012.

(30) Foreign Application Priority Data

Mar. 29, 2011 (FR) ...................................... 11 52562

(51) Int. Cl.
*E05C 19/10* (2006.01)
*B64D 29/06* (2006.01)
(Continued)

(52) U.S. Cl.
CPC .............. *B64D 29/06* (2013.01); *E05B 41/00* (2013.01); *E05B 63/143* (2013.01);
(Continued)

(58) Field of Classification Search
CPC .............................. Y10S 292/04; Y10S 292/11
(Continued)

(56) References Cited

U.S. PATENT DOCUMENTS

| 986,659 A | * | 3/1911 | Voight | .................... | E05B 41/00 |
| | | | | | 70/438 |
| 1,749,649 A | * | 3/1930 | Rolph | ..................... | E05B 41/00 |
| | | | | | 70/438 |

(Continued)

FOREIGN PATENT DOCUMENTS

| FR | 2920170 A1 | 2/2009 |
| WO | 2006033929 A2 | 3/2006 |

OTHER PUBLICATIONS

International Search Report issued in International Application No. PCT/FR2012/050586.

*Primary Examiner* — Carlos Lugo
(74) *Attorney, Agent, or Firm* — Burris Law, PLLC

(57) ABSTRACT

A locking device between a first structure and a second structure includes a bolt to lock the first and second structures, an indicator as to whether the bolt has locked/unlocked the structures, and a connecting system. The bolt includes a lock bolt attached to the first structure and able to engage a hook which is attached to the second structure. In particular, the connecting system connects the bolt with the lock bolt to the indicator, and the hook is mounted such that it can move between a first position in which it is engaged with the lock bolt and allows the indicator to be locked, and a second position in which the hook is free of the lock bolt and allows the indicator to be unlocked.

19 Claims, 2 Drawing Sheets

(51) Int. Cl.
  *E05B 41/00* (2006.01)
  *E05B 63/14* (2006.01)
  *E05C 1/08* (2006.01)
  *E05B 53/00* (2006.01)

(52) U.S. Cl.
  CPC ........... *E05B 53/003* (2013.01); *Y10S 292/04* (2013.01); *Y10S 292/11* (2013.01); *Y10T 292/0911* (2015.04)

(58) Field of Classification Search
  USPC ........................................ 292/150, 163, 129
  See application file for complete search history.

(56) References Cited

U.S. PATENT DOCUMENTS

| | | | | |
|---|---|---|---|---|
| 2,638,770 | A * | 5/1953 | Gutman | E05B 41/00 70/107 |
| 2,939,307 | A * | 6/1960 | Trammell, Jr. | E05B 85/08 292/150 |
| 3,087,749 | A * | 4/1963 | Capton | E05C 3/24 292/106 |
| 4,179,143 | A * | 12/1979 | Shy | E05C 1/04 292/150 |
| 4,938,508 | A * | 7/1990 | Thomas | E05C 3/047 292/106 |
| 5,044,678 | A * | 9/1991 | Detweiler | E05B 47/026 292/144 |
| 5,518,206 | A | 5/1996 | Arnold et al. | |
| 5,664,811 | A * | 9/1997 | Martus | B60K 15/05 292/144 |
| 5,836,638 | A * | 11/1998 | Slocum | B60K 15/05 220/86.2 |
| 5,884,958 | A * | 3/1999 | Oddenino | B60K 15/04 296/97.22 |
| 6,499,789 | B2 * | 12/2002 | Moll | B60K 15/05 292/28 |
| 6,702,357 | B2 * | 3/2004 | Joerg | B60K 15/05 220/86.2 |
| 7,552,954 | B2 * | 6/2009 | Rozo | E05B 5/00 292/143 |
| 8,764,072 | B2 * | 7/2014 | Gonidec | B64D 29/06 292/106 |
| 2004/0104583 | A1 | 6/2004 | Porte | |
| 2010/0006701 | A1 | 1/2010 | Gallego Pleite et al. | |
| 2011/0113837 | A1 | 5/2011 | Soulier et al. | |

* cited by examiner

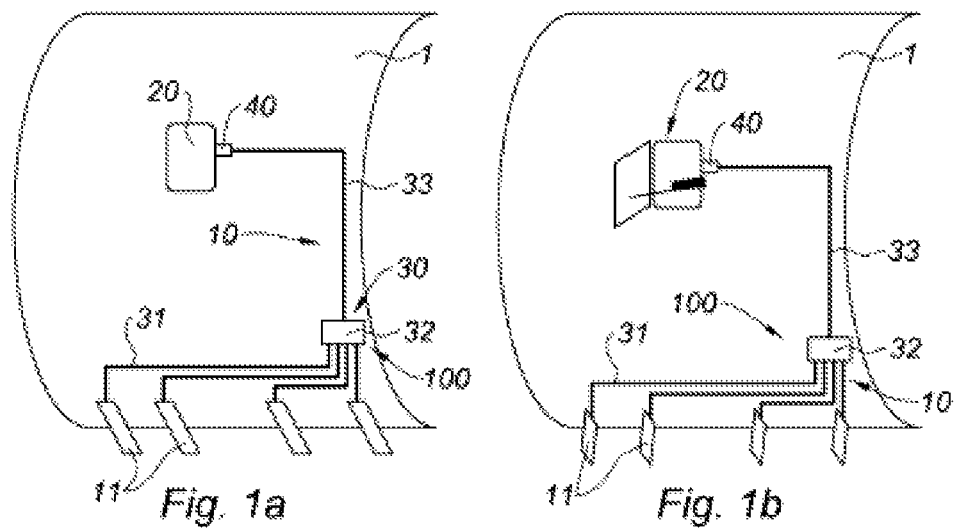
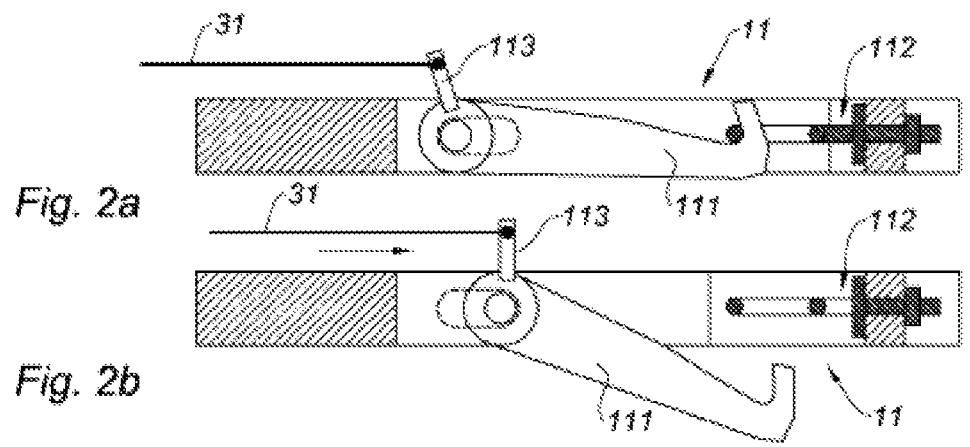
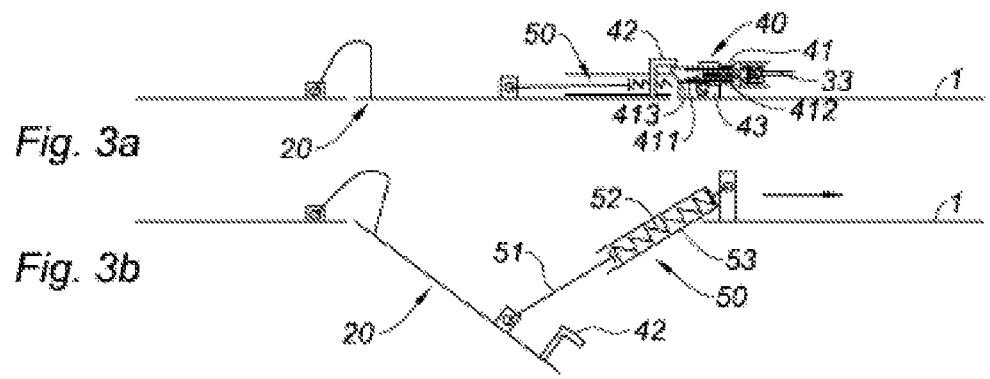

LOCKING DEVICE WITH MECHANICAL DETECTION OF CLOSURE AND OPENING

CROSS-REFERENCE TO RELATED APPLICATIONS

This application is a continuation of International Application No. PCT/FR2012/050586, filed on Mar. 21, 2012, which claims the benefit of FR 11/52562, filed on Mar. 29, 2011. The disclosures of the above applications are incorporated herein by reference.

FIELD

The present disclosure relates to a system for locking a turbojet engine nacelle cowl.

BACKGROUND

The statements in this section merely provide background information related to the present disclosure and may not constitute prior art.

An airplane nacelle is designed to surround a turbojet engine and produce the thrust for the turbojet engine by channeling the flows created by the engine. It must also be able to be opened in order to access the engine and its equipment.

Most turbojet engine nacelles comprise a fan cowl surrounding the fan case of the engine and a rear body (often the thrust reverser) surrounding the central part of the engine.

To provide access to the engine and its equipment, these two nacelle components generally open in two half-parts.

The opening of these cowls is made possible owing to the presence of hinges, generally mounted in the upper part of the nacelle, in the so-called twelve o'clock position, along a mast line, and are kept closed owing to a plurality of bolts generally mounted along a locking line in the lower portion, called the six o'clock portion.

It is of course important that after a maintenance operation, all of the bolts be closed.

To that end, it is important to be able to provide, effectively, safely and quickly, that all of the opening cowls of a nacelle are properly locked before starting up the nacelle.

Today, in most cases, this verification is based almost entirely on the vigilance of the operator performing the locking operation.

As a result, certain maintenance errors have caused a significant number of poor fan cowl closures, sometimes causing major in-flight events (opening and/or loss of a fan cowl).

One of the most frequent causes of in-flight opening is the partial closure or opening of the cowl bolts.

In that scenario, it is often difficult during a routine verification to see that one or more bolts are closed incorrectly, since locking a single bolt "positions" the cowl, which then appears correctly closed from a distance.

A clear indicator of the locking state of the nacelle cowls improves flight safety.

This indicator is crucial to alert maintenance operators or any other personnel to the fact that the locking of the cowls has not been done correctly.

One thereby avoids complete or partial destruction of the cowls during flight.

Furthermore, to provide an effective system for detecting the locking of the nacelle cowls, it must be impossible to initiate unlocking or to be able to partially unlock the cowl without the corresponding locking state indicator displaying an unlocked state.

There is also a need for a system for detecting the locking of the nacelle cowls meeting the aforementioned requirements.

In particular, electric locking detection systems for nacelle cowls are known making it possible to perform a visual check of the situation.

Such an electrical system nevertheless requires an electrical power source and is subject to any electrical failures.

Where mechanical detection systems are concerned, one of the difficulties is then making sure that the state indicator for the locking of the nacelle cowls displays an unlocked state once the first bolt is open, and vice versa, that that indicator cannot transition to the locked state unless absolutely all of the bolts are locked.

Furthermore, the existing mechanical detection systems are limited to checking the position of the handle of the bolt, whereas the desired mechanical function is the stressing of the bolts.

Thus, a mechanical detection system is known that provides for painting a bright color on a bolt handle mounted on the aerodynamic line of the nacelle. More specifically, the flank of the handle of the bolt is painted a bright color and the center of gravity of the bolt causes it to pivot such that it protrudes past the aerodynamic lines of the nacelle.

A visual inspection makes it possible to detect this orange color, which protrudes past the nacelle.

Also known is a mechanical detection system that provides for covering the bolts whereof the handle is mounted inside the aerodynamic lines of the nacelle with a hatch that provides the continuity of the lines of the nacelle.

This hatch cannot be closed when the bolt is not correctly locked, as interference is created between said hatch and the handle of the bolt.

To date, nacelles are known having a very low ground clearance, which necessarily requires that the locking indicators of the nacelle cowls be moved onto the side walls of the nacelle and above the latter.

The aforementioned systems cannot meet this requirement, making them irrelevant.

In this context, also known is a mechanical detection system for detecting the locking of the nacelle cowl able to meet the new constraints imposed by the current nacelles.

Such a system is protected by French patent application no. 10/58591, not yet published, in which a locking device is proposed between a first structure and a second structure of a cowl, comprising at least one locking pair including at least one lock bolt attached to the first structure and capable of engaging with at least one corresponding retaining means, attached to the second structure, the lock bolt being movably mounted against at least one elastic return means tending to return it to a position separated from the retaining means.

This locking device comprises a detection control rod, movably mounted between a first position in which it allows unlocking of the lock bolt of the retaining means, at least one part of the lock bolt then engaging with the control rod, so as to block it from potentially returning to a second position, and said second position in which the control rod engages with at least part of the locking pair so as to block the unlocking thereof.

However, this detection system has drawbacks.

On the one hand, it is extremely complex, multiplying the mechanical parts that must interact with each other to allow effective detection.

Furthermore, the position of the lock bolt of the locking pair is adjustable, so as to offset the leveling between the different structures of a cowl, which creates a quite variable position of the end of the lock bolt with respect to the control rod from one reverser to another.

It is thus difficult to ensure that in all scenarios, whether with extreme allowances or during deformation of parts, incorrect locking of the cowl will definitely be detected.

Furthermore, in this detection system, the detection control rod is subject to a visual indicator of the hatch type.

This assembly requires that this indicator be placed on the half-cowl bearing the lock bolt of the bolt while to open/close a bolt, one places oneself on the opposite half-cowl bearing the handle of the bolt.

Thus, this visual indicator is in fact only slightly or not at all visible to an operator having decided to open a bolt to perform maintenance on the nacelle.

This creates a risk of that operator damaging the handle of the bolt before realizing that the visual indicator was not open.

Thus, the operator must necessarily open the visual indicator before any opening of the bolt.

However, insofar as this indicator is offset with respect to the handle of the bolt, the operator must move on either side of the nacelle to open the bolts, which makes the detection system labor-intensive and not very practical.

SUMMARY

The present disclosure includes a locking device between a first structure and a second structure limiting the actions and movements to be done by the operator to detect unlocking of the nacelle cowl, in particular with respect to the nacelle standard to open the bolts.

In addition, the present disclosure includes a locking device between a first structure and a second structure that provides systematic detection of incorrect locking of the cowl.

To that end, the present disclosure provides a locking device between a first structure and a second structure, comprising at least one locking means designed to lock said first and second structures to each other, said locking means comprising at least one lock bolt attached to the first structure and able to engage in at least one means of engagement with the corresponding lock bolt which is attached to the second structure, said locking device being characterized in that it further comprises:
an indicator as to whether the locking means has locked/unlocked the structures relative to one another, which is mounted on the same structure as the means of engagement with the lock bolt, said indicator having at least one locked state and one unlocked state,
a connecting system connecting the means of engagement with the lock bolt to said indicator, the means of engagement with the lock bolt being mounted such that it can move between a first position in which it is engaged with the lock bolt and allows said indicator to be locked, and a second position in which is free of the lock bolt and allows said indicator to be unlocked.

According to specific forms of the present disclosure, the device may comprise one or more of the following features, considered alone or in technically possible combinations:
the connecting system comprises means for controlling the change of state of said indicator, said control means being controlled by the position adopted by the means of engagement with the lock bolt.
the means for controlling the state change of said indicator further comprises means for automatic opening of said indicator.
said automatic opening means of said indicator may comprise an actuating link rod mounted at one of its ends on said indicator and connected at the opposite end to elastic means mounted on the second structure.
said automatic opening means of said indicator may comprise a piston associated with the elastic means.
the control means are capable of controlling locking means of said indicator suitable for: engaging with said indicator or the automatic opening means of said indicator when the means of engagement when the lock bolt is in the first position, and releasing said indicator when the means of engagement when the lock bolt is in the second position.
the locking means of said indicator may comprise a blocking rod of the indicator mounted so as to move in translation on the second structure, said rod being suitable for engaging either with a shoulder formed by said indicator or with a groove formed by the automatic opening means of the indicator.
the device comprising several locking means for locking said structures to each other, in particular arranged along a locking line, the connecting system comprises means for controlling the state change of said indicator shared by each of said locking means for locking said structures to each other, connected to each of them by at least one mechanical transmission means.
the means controlling the state change of said indicator shared by each of said locking means for locking said structures to each other comprise a control unit connected at one end to each of said mechanical transmission means, and at an opposite end, to the locking means of said indicator, said unit being slidingly mounted on the second structure.

The present disclosure also relates to a turbojet engine nacelle comprising at least one moving cowl, characterized in that it comprises at least one locking device associated with any one of the claims.

More particularly, it may be a moving cowl of a middle section surrounding a fan of the turbojet engine and/or a thrust reverser cowl.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1a and 1b are diagrammatic illustrations of an opening nacelle cowl equipped with a locking device according to a first form of the present disclosure, said device comprising a locking indicator of the cowl in the closed and open position, respectively;

FIGS. 2a and 2b are diagrammatic longitudinal cross-sectional side views of a locking means of the device of FIG. 1, said locking means respectively being locked and unlocked;

FIGS. 3a and 3b are diagrammatic cross-sectional illustrations of a first form of automatic opening/closing means for the indicator of FIG. 1a in particular, said indicator respectively being closed and open;

FIG. 4 is a diagrammatic cross-sectional illustration of a second form of automatic opening/closing means of the indicator of FIG. 1a;

Figures 5A, 5B:
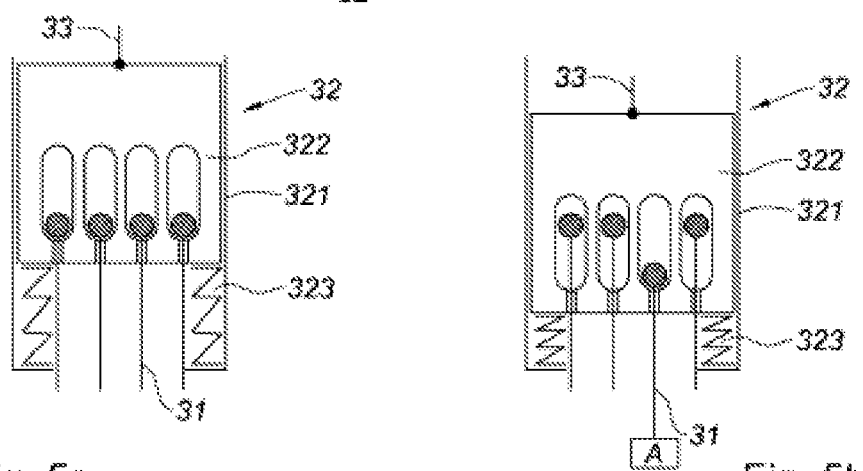
Figure 6:
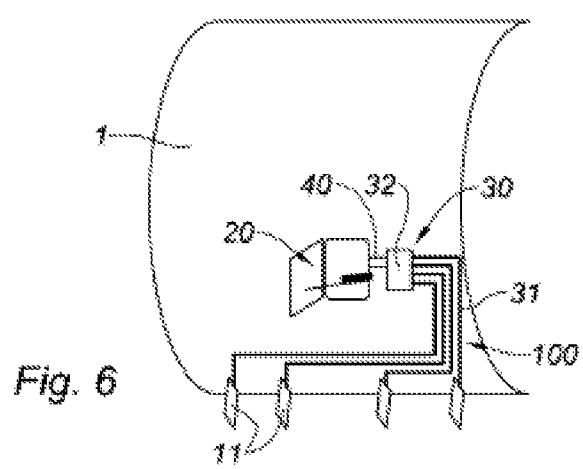

FIGS. 5a and 5b are diagrammatic cross-sectional illustrations of a form of control means for changing the state of the indicator of FIG. 1a, said indicator being closed and open, respectively; and FIG. 6 is a diagrammatic illustration of an opening nacelle cowl equipped with a locking device according to a second form of the present disclosure, said device comprising a locking indicator for the cowl in the open position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1a and 1b illustrate an opening cowl 1 of a turbojet engine nacelle (not shown). More particularly, this may be a fan cowl or a thrust reverser cowl.

The cowl 1 is pivotably mounted around an upper hinge line (not shown) and can be locked in the lower part at a locking line along which a locking device 10 according to the present disclosure is installed.

This locking device 10 comprises at least one locking means 11 suitable for locking two parts of the cowl 1.

In the figures, the locking device 10 comprises several locking means 11 mounted on a locking line.

A bolt 11 is shown in detail in FIGS. 2a and 2b.

It traditionally comprises a lock bolt 112 assuming the form of a stirrup 112 and capable of engaging with at least one engagement means assuming the form of the hook 111.

The stirrup 112 is stationary with respect to the structure of the bolt on which it is mounted.

The stirrup 112 is attached to a part of the cowl 1, while the hook 111 is connected to a second part of the cowl, the first and second parts of the cowl 1 being designed to be locked.

Furthermore, in reference to FIGS. 1a and 1b, the device 10 further comprises an indicator 20 of the locking/unlocking of the bolt(s) of the different parts of the cowl 1 with respect to each other.

This indicator is, in one non-limiting example of the present disclosure, a hatch 20.

This hatch 20 is mounted on the same part of the cowl 1 as the hook 11. It has at least one locked state and one unlocked state.

As illustrated in FIG. 1a, in one form, the locked state of the hatch 20 may amount to the closing of the hatch 20, while the unlocked state of the hatch 20 amounts to the opening of the hatch 20, as illustrated in FIG. 1b.

Advantageously, for each bolt 11, the hook 111 of the bolt 11 is mounted so as to be able to move between a first position, in which it is engaged with the stirrup 112 (illustrated in FIG. 2a) and allows locking of the hatch 20, and a second position, in which it is freed from the stirrup 112 (illustrated in FIG. 2b) and allows unlocking of the hatch 20.

To that end, the device 10 further comprises a suitable connecting system 100 that connects the hook 111 of each corresponding bolt to the hatch 20.

Such a connecting system 100 comprises control means 30 for controlling the change of state of the hatch 20 controlled by the position adopted by the hook 11 of each bolt 11.

These control means 30 are capable of controlling locking means of the hatch 20. More specifically, for each of the bolts 11, they comprise a mechanical transmission element 31 connected to a hook 111, as illustrated in FIG. 2a in particular.

In one non-limiting example, such an element 31 may be a cable. However, other alternative forms are possible, for example such as a chain.

In this FIG. 2a, a finger 113 mounted protruding from the body of the hook 111 is provided to receive one end of the cable 31.

It should be noted that this finger may also be mounted on the bolt 11 and, in particular, on the handle connected to the hook 111.

The mounting of this finger 113 results in modifying the type of bolt of the cowl 1 concerned by the locking device according to the present disclosure.

Thus, when the end of the cable 31 is fixed on the hook 111, i.e., on the body of the bolt 11, the locking system will be that regarding so-called primary bolts.

On the other hand, when the end of the cable 31 is fixed on the handle (not shown) connected to the hook 111 of a bolt, the locking system will be that regarding the so-called secondary bolts.

Furthermore, as illustrated in particular in FIG. 1a, the control means 30 further comprise a control unit 32 connected to each of the cables 31 connected to the hooks 111 of the bolts.

One particular form of the control unit 32 will be described later with respect to FIGS. 5a and 5b.

In one form, such a control unit 32 may also be connected, by a single mechanical transmission element 33, to locking means 40 of the hatch 20. Such a mechanical transmission element 33 may, as before, be a cable or any other suitable element.

In one alternative form illustrated in FIG. 6, the control housing 32 may also be directly connected to the locking means 40 of the hatch 20. The single mechanical transmission element 33 is eliminated.

In reference to FIGS. 3a and 3b, regarding the locking means 40 of the hatch 20, the latter are suitable for:

engaging with the hatch 20 when the hook 111 is in the first position engaged with the stirrup 112, which will cause closing of the hatch 20, as illustrated in FIG. 1a, and freeing the hatch 20 when the hook 111 is no longer engaged with the stirrup 112, which will cause opening of the hatch 20, as illustrated in FIG. 1b.

More specifically, in this alternative form, the locking means 40 are of the latch type 41.

They comprise a rod 411 that can move in translation in a slide 412 against elastic return means 413, the assembly being mounted, using a suitable housing 43, on the cowl part 1 comprising the hatch 20.

The rod is movable between:

a deployed position, in which it cooperates with a shoulder 421 formed on the hatch 20, so as to prohibit any opening of the hatch 20, the elastic return means 413 being relaxed (illustrated in FIG. 3a), and a retracted position, in which it frees the shoulder 421, compressing the elastic return means 413.

The rod 411 being connected to one end of the cable 33 indirectly connecting it to the control unit 32, the slide of the rod 411 and its deployed or retracted position thus depend on the position of the hooks 111 of the bolts 11.

In one non-limiting example illustrated in FIGS. 3a and 3b, a thin profile 42 is formed on the inner face of the hatch 20 protruding therefrom.

One of the branches of the profile 42 forming the shoulder 421 extends such that the rod 411 can form an abutment for that branch when the hatch 20 can be driven in outward rotation so as to be opened.

Thus, as illustrated in FIG. 3a, when the hook 111 is in the first position engaged with the stirrup 112, the rod 411 slides, and places itself in the deployed position so as to form an abutment for the shoulder 421, which causes closing of the hatch 20.

As illustrated in FIG. 3b, when the hook 111 is no longer engaged with the stirrup 112, the rod 411 is driven by the control means 30 in a translational movement toward its retracted position, as indicated by the arrow. It slides in the slide 412, freeing the shoulder 421 and consequently the hatch 20, allowing the latter to pivot and open.

One form of the control unit 32 is shown in reference to FIGS. 5a and 5b. Such a control unit 32 is mounted on the part of the cowl 1 comprising the hooks 111 of the bolts 11.

As previously indicated, it is connected to the cables 31 secured to the hooks 111 of the bolts 11 and the cable 33 connected to the locking means of the hatch 20 and, more particularly, to the locking rod of the hatch 411.

The control unit 32 comprises a hollow sleeve 321 open at both opposite ends.

Guide means 322 for the rod 411 for locking the hatch 20 are housed in the sleeve 321. These guide means 322 are secured to cables 31 connected to the hooks 111 of the bolts 11 and the cable 33 connected to the locking means of the hatch 20. These guide means 322 may be movable in translation without friction within the sleeve 321, for example like a piston.

The movement of the piston 322 is driven by the movement of the cables 31 connected to the hooks 111 when the latter go from the locked position of the bolt 11 to an unlocked position of the bolt 11, or vice versa.

The movement of the piston 322 will cause the sliding of the cable 33 and, consequently, that of the rod 411, driving the locking or unlocking of the hatch 20 depending on the direction of movement. This mechanism is reversible.

In fact, within the sleeve 321, elastic return means 323 bear on the base of the sleeve 321 situated on the side of the cables 31 connected to the bolts 11 at one end and are blocked at their opposite end by a flat surface of the piston 322.

These elastic return means 323 include a compression spring capable of compressing when the piston 322 slides in the sleeve 321 and the cable 33 simultaneously pulls on the rod 411 to free the hatch 20. This is illustrated in FIG. 5b, in which a single bolt designated A is being unlocked.

These elastic return means 323 tend to return the piston 322 to a position in which the rod 411 locks and drives the closure of the hatch 20. This is illustrated in FIG. 5a, in which all of the bolts are locked, the elastic return means 323 relaxing, moving the piston 322 into a position corresponding to that of the locking of the hatch 20.

Furthermore, in reference to FIGS. 3a and 3b, the control means 30 controlling the state change of the hatch 20 further comprises means 50 for automatic opening of the hatch 20.

In one alternative form, the automatic opening means of the hatch 20 may comprise an actuating link rod 51 mounted at one of its ends on the hatch 20 and connected at the opposite end to at least one elastic return means 52 mounted in a housing 53 suitable for the part of the cowl 1 bearing the hook of the bolt 1.

Such means are suitable for automatically driving the pivoting of the hatch 20 when the locking rod 411 has freed the shoulder 42 from the hatch 20.

In fact, the hatch 20 no longer being locked, the elastic return means 52 tend to relax, causing, owing to the link rod 51, the pivoting movement of the hatch 20.

Thus, the elastic return means 52 provide that when all of the bolts 11 are locked, the control unit 32 returns to a position which allows the automatic locking of the hatch 20 when it is manually closed.

In reference to FIGS. 2a, 2b, 3a, 3b, 5a, 5b, a locking device 10 according to the present disclosure is implemented as follows.

In FIG. 2a, the bolt 11 is locked.

Once a bolt 11 is opened, whichever one it may be, as illustrated in FIG. 2b, traction is exerted on the corresponding cable 31 as indicated by the arrow.

In reference to FIG. 5b, this movement of the cable 31 drives the sliding of the piston 322 in the sleeve 321 and the compression of the spring 323.

The movement of the piston 321 causes that of the cable 33, connecting the unit 32 to the locking rod 411 of the hatch 20, which is secured thereto.

In reference to FIGS. 3a and 3b, the pulling on the cable 33 allows and drives the sliding of the rod 411 so as to unlock the hatch 20.

The hatch 20 being unlocked, it can pivot and open under the action of the link rod 51 and the spring 52.

The operator will thus visually observe the opening of the hatch 20 without difficulty, since it is situated on the same structure as the hook 111 of the bolt 11.

As long as a bolt 11 is open, one pulls on the transmission cables 31, 33 and the hatch 20 cannot be kept closed.

In one alternative form of the control unit 32 illustrated in FIG. 6, as previously indicated, the latter cooperates directly with the locking means 40 of the hatch 20.

By installing the control unit 32 near the hatch 20, the locking means 40 may be directly integrated into the unit 32.

One thus eliminates numerous parts to be managed, in particular by eliminating the single cable 33, the spring at the interface between the rod 411 and the slide 412 and the support 413.

This alternative may be interesting for a small cowl or if the hatch 20 may be positioned closer to the bolt 11.

Figure 4:
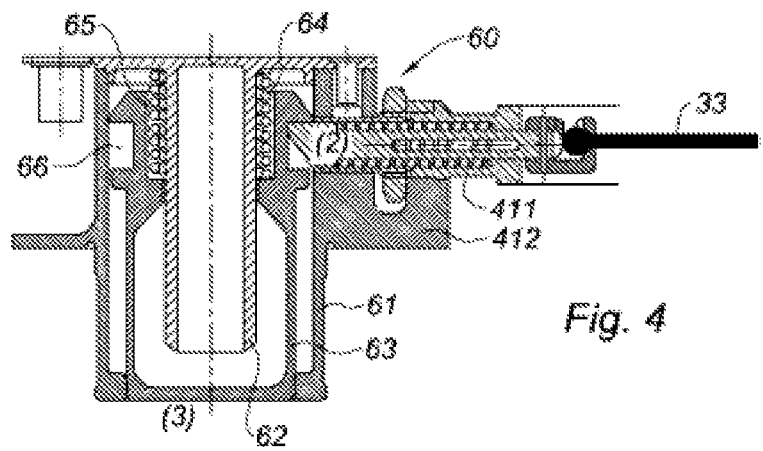

In one alternative form illustrated in FIG. 4, an alternative of the automatic opening/closing means 60 of the hatch 20 is shown.

In this alternative, the locking means 40 are suitable for:
engaging with the automatic opening/closing means 60 of the hatch 20 when the hook 111 is in the first position engaged with the stirrup 112, which will cause closing of the hatch 20, as illustrated in FIG. 1a, and
freeing the hatch 20 when the hook 111 is no longer engaged with the stirrup 112, which will cause opening of the hatch 20 as illustrated in FIG. 1b.

As illustrated in FIG. 4, the automatic opening/closing means 60 of the hatch 20 comprise a hollow housing 61 open at one free end.

A shaft 62 is mounted at the center of that housing 61.

A piston 63 is also provided mounted on the shaft coaxially.

This piston comprises an end opposite the free end of the housing 61, an annular groove 65 in which the spring-type elastic return means 64 is housed.

This spring 64 bears on the base of the housing 61 at one end and is blocked at its opposite end by the bottom of the groove 65 of the piston 63.

The compression spring 64 is capable of compressing when the piston 63 slides in the housing 61 to engage with the locking rod 411, as illustrated in FIG. 4.

To that end, the piston 63 comprises a retaining groove 66 on its periphery, said groove being configured such that the rod 411 is housed in the concavity of the retaining groove 66 and forming an abutment for the side wall of the retaining groove 66.

Thus, when traction is exerted on the cable 33, the rod 411 slides toward its retracted position, frees the piston 63, which, under the effect of the expansion of the spring 65, slides in the housing 61, and its free end pushes the hatch 20 such that it opens automatically. This mechanism is of course reversible.

Owing to a locking device 10 according to the present disclosure, the locking/unlocking indicator 20 of the bolts 11 of the cowl 1 will always correctly indicate the state of the bolts 11 and will prevent any state change that is not passed on to the indicator 20.

In fact, the indicator 20 may only be placed in a locked state, i.e., closed and indicating that the cowl is indeed locked and completely locked, if all of the bolts 11 have been relocked.

In fact, in light of the connecting system and control means 30, a single non-relocked bolt blocks the locking of the indicator 20 and does not allow it to return to the closed position.

Furthermore, the opening of the indicator 20 indicating the locking/unlocking of the bolts 11 of the cowl 1 is automatic once at least one bolt 11 is opened, which implies that the opening sequence of the cowls is identical to the nacelle standard in which there is no need to open the indicator 20 before opening the bolts 11.

The locking device 10 according to the present disclosure proposes a safe, simple and effective locking detection system.

In this device, the chain of dimensions is very direct, which reinforces the effectiveness of the device.

Advantageously, with such a device, insofar as the hatch 20, the hook 11 of the bolt, and the connecting system 100 between the two are mounted on the same part of the cowl 1 to be locked, the operator identifies the hatch even before accessing the bolts 11.

The movements between the two parts of the cowl 11 to be locked together are eliminated, which facilitates maintenance operations and decreases the risks of deterioration of the bolts 11.

Furthermore, the device 10 according to the present disclosure is mechanical and is therefore reliable and not subject to electrical failure.

Although the present disclosure has been described with one particular example form, it is of course in no way limited thereto and encompasses all technical equivalents of the described means, as well as combinations thereof if they are within the scope of the present disclosure.

In particular, the indicator is not limited to the use of a hatch 20 and may be any visual indicator capable of having two distinct states.

What is claimed is:

1. A locking device between a first structure and a second structure, comprising at least one locking means designed to lock said first and second structures to each other, said locking means comprising at least one lock bolt attached to the first structure and able to engage in at least one means of engagement with a corresponding lock bolt which is attached to the second structure, wherein said locking device further comprises:
    an indicator as to whether the locking means has locked/unlocked the structures relative to one another, the indicator mounted on said first structure, wherein said indicator has at least one locked state and one unlocked state;
    a connecting system connecting the means of engagement with the lock bolt to said indicator; and
    a control unit comprising:
        a guide means connected at one end to a cable connected to the indicator, and at an opposed end to a transmission element connected to the lock bolt for guiding the locking means; and
        an elastic return means bearing against the guide means to drive the locked state of the indicator,
    wherein the lock bolt can move between a first position, where the elastic return means is relaxed and the lock bolt is engaged with the means of engagement and allows said indicator to be locked, and a second position, where the elastic return means is compressed and a control means moves the lock bolt to be free of engagement with the means of engagement and allows said indicator to be unlocked.

2. The locking device according to claim 1, wherein the connecting system comprises means for controlling a change of state of said indicator.

3. The locking device according to claim 2, wherein the means for controlling the state change of said indicator is controlled by a position adopted by the means of engagement with the lock bolt.

4. The locking device according to claim 2, wherein the means for controlling the state change of said indicator further comprises means for automatic opening of said indicator.

5. The locking device according to claim 4, wherein said means for automatic opening of said indicator comprises an actuating link rod mounted at one of its ends on said indicator and connected at an opposite end to the elastic return means mounted on the first structure wherein the actuating link rod moves in translation in a slide against said elastic return means.

6. The locking device according to claim 4, wherein said means for automatic opening of said indicator comprise a piston associated with the elastic return means and an actuating rod engaged with the piston.

7. The locking device according to claim 4, wherein the means for controlling the state change are capable of controlling locking means of said indicator suitable for: engaging with said indicator or the means for automatic opening of said indicator when the means of engagement and the lock bolt is in the first position, and releasing said indicator when the means of engagement and the lock bolt is in the second position.

8. The locking device according to claim 7, wherein the locking means of said indicator comprise a blocking rod of the indicator mounted so as to move in translation on the second structure, said rod being suitable for engaging either with a shoulder formed by said indicator or with a groove formed by the means for automatic opening of the indicator.

9. The locking device according to claim 1, wherein the locking device comprises several locking means for locking said structures to each other, being arranged along a locking line, wherein the connecting system comprises means for controlling the state change of said indicator shared by each of said locking means, the means for controlling the state change connected to each of the locking means by at least one mechanical transmission means.

10. The locking device according to claim 9, wherein the means for controlling the state change of said indicator shared by each of said locking means for locking said structures to each other comprise the control unit connected at one end to each of said mechanical transmission means, and at an opposite end, to the locking means of said indicator, said unit being slidingly mounted on the second structure.

11. A turbojet engine nacelle comprising at least one moving cowl, wherein it comprises at least one locking device according to claim 1.

12. The nacelle according to claim 11, wherein the moving cowl is a moving cowl of a middle section surrounding a fan of the turbojet engine and/or a thrust reverser cowl.

13. A locking system comprising:
- a locking device to lock a first structure and a second structure, the locking device comprising at least one lock bolt having one portion attached to the first structure and an engagement device attached to the second structure;
- an indicator mounted on a same structure as the at least one lock bolt, the indicator controlled by locking/unlocking positions of the engagement device;
- a connecting system connecting the locking device to the indicator; and
- a control unit comprising:
  - a guide means connected at one end to a cable connected to the indicator, and at an opposed end to a transmission element connected to the lock bolt guiding the locking means; and
  - an elastic return means bearing against the guide means to drive the locked state of the indicator,
- wherein the lock bolt can move between a first position, where the elastic return means is relaxed and the lock bolt is engaged with the means of engagement and allows said indicator to be locked, and a second position, where the elastic return means is compressed and a control means moves the lock bolt to be free of engagement with the means of engagement and allows said indicator to be unlocked.

14. The locking system according to claim 13, wherein the connecting system comprises the control unit to control a change of state of the indicator via a locking device of the indicator.

15. The locking system according to claim 14, wherein the control unit comprises an actuator to automatically open the indicator.

16. The locking system according to claim 15, wherein the actuator comprises an actuating link rod mounted on at one of its ends on the indicator and connected at the opposite end to the elastic return means mounted on the second structure, wherein the actuating link rod moves in translation in a slide against said elastic return means.

17. The locking system according to claim 14, wherein the locking device of the indicator comprises a blocking rod mounted so as to move in translation on the second structure, said blocking rod engaging either with a shoulder formed by the indicator or with a groove formed by the actuator.

18. The locking system according to claim 14, wherein the control unit is mounted on the second structure and connected to a plurality of locking devices to lock the structures each other via at least one mechanical transmitter.

19. The locking system according to claim 13, wherein the locking device comprises several locking means for locking said structures to each other, being arranged along a locking line, wherein the connecting system comprises means for controlling the state change of said indicator shared by each of said locking means, the means for controlling the state change connected to each of the locking means by at least one mechanical transmission means.

\* \* \* \* \*